(12) United States Patent
Cheng et al.

(10) Patent No.: US 9,219,413 B2
(45) Date of Patent: Dec. 22, 2015

(54) POWER SUPPLIES RESPONSIVE TO MULTIPLE CONTROL SIGNAL FORMATS

(75) Inventors: Wing Ling Cheng, Taipo (HK); Conor Quinn, Saint Paul, MN (US)

(73) Assignee: ASTEC INTERNATIONAL LIMITED, Kowloon (HK)

( * ) Notice: Subject to any disclaimer, the term of this patent is extended or adjusted under 35 U.S.C. 154(b) by 25 days.

(21) Appl. No.: 13/468,740

(22) Filed: May 10, 2012

(65) Prior Publication Data

US 2013/0221944 A1   Aug. 29, 2013

(30) Foreign Application Priority Data

Feb. 23, 2012 (CN) .......................... 2012 1 0044490
Feb. 23, 2012 (CN) .......................... 2012 2 0063872

(51) Int. Cl.
*H02M 3/156* (2006.01)
*H02M 3/157* (2006.01)

(52) U.S. Cl.
CPC ..................................... *H02M 3/157* (2013.01)

(58) Field of Classification Search
CPC ................. H02M 2001/0032; H02M 3/157; H02M 3/33507; Y02B 60/1285; G06F 1/26; G06F 1/3203; H02J 13/0003
USPC .................. 323/318, 326, 351, 271, 282–285
See application file for complete search history.

(56) References Cited

U.S. PATENT DOCUMENTS

| | | | |
|---|---|---|---|
| 7,834,612 B2 * | 11/2010 | Sohnis et al. | 323/318 |
| 2002/0136038 A1 * | 9/2002 | Spitaels et al. | 363/95 |
| 2004/0135560 A1 * | 7/2004 | Kernahan et al. | 323/282 |
| 2005/0162265 A1 * | 7/2005 | Werner et al. | 340/468 |
| 2006/0052905 A1 * | 3/2006 | Pfingsten et al. | 700/286 |
| 2007/0247134 A1 * | 10/2007 | Ryan et al. | 323/318 |
| 2008/0106248 A1 * | 5/2008 | Qahouq et al. | 323/318 |
| 2010/0079081 A1 | 4/2010 | Zhang et al. | |
| 2010/0277104 A1 | 11/2010 | Lin et al. | |
| 2011/0193629 A1 * | 8/2011 | Hou et al. | 330/127 |

OTHER PUBLICATIONS

LDS70 Series Data Sheet, Emerson Network Power; Feb. 2011.

* cited by examiner

*Primary Examiner* — Adolf Berhane
*Assistant Examiner* — Henry Lee, III
(74) *Attorney, Agent, or Firm* — Harness, Dickey & Pierce, P.L.C.

(57) ABSTRACT

A power supply includes a power circuit for converting an input voltage or current to an output voltage or current, at least one interface port for receiving signals from one or more external devices, and a control circuit coupled to the power circuit and the at least one interface port. The control circuit is adapted to operate the power circuit in response to control signals having a plurality of different control signal formats that are received by the at least one interface port.

24 Claims, 5 Drawing Sheets

POWER SUPPLIES RESPONSIVE TO MULTIPLE CONTROL SIGNAL FORMATS

CROSS-REFERENCE TO RELATED APPLICATIONS

This application claims the benefit and priority of Chinese Patent of Invention Application No. 201210044490.6 filed Feb. 23, 2012 and Chinese Utility Model Application No. 201220063872.9 filed Feb. 23, 2012, the entire disclosures of which are incorporated herein by reference.

FIELD

The present disclosure relates to AC/DC and DC/DC power supplies that are responsive to multiple control signal formats.

BACKGROUND

This section provides background information related to the present disclosure which is not necessarily prior art.

AC/DC and DC/DC power supplies are used in a wide variety of applications for converting an AC or DC voltage or current into a different DC voltage or current. Each power supply is typically designed for a specific application, and has specific current, voltage, frequency and/or power ratings suitable for that application.

Some power supplies also have one or more control signal inputs for controlling the power supply's operation. For example, some power supplies have a binary (i.e., two-state) control signal input, and output a constant DC current at either a first current level or a second current level depending on the state of the binary control signal. Similarly, some power supplies have an input for receiving a DC voltage control signal ranging between zero and ten volts, and output a constant DC current having a current level corresponding to the value of the DC voltage control signal.

SUMMARY

This section provides a general summary of the disclosure, and is not a comprehensive disclosure of its full scope or all of its features.

According to one aspect of the present disclosure, a power supply includes a power circuit for converting an input voltage or current to an output voltage or current, at least one interface port for receiving signals from one or more external devices, and a control circuit coupled to the power circuit and the at least one interface port. The control circuit is adapted to operate the power circuit in response to control signals having a plurality of different control signal formats that are received by the at least one interface port.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
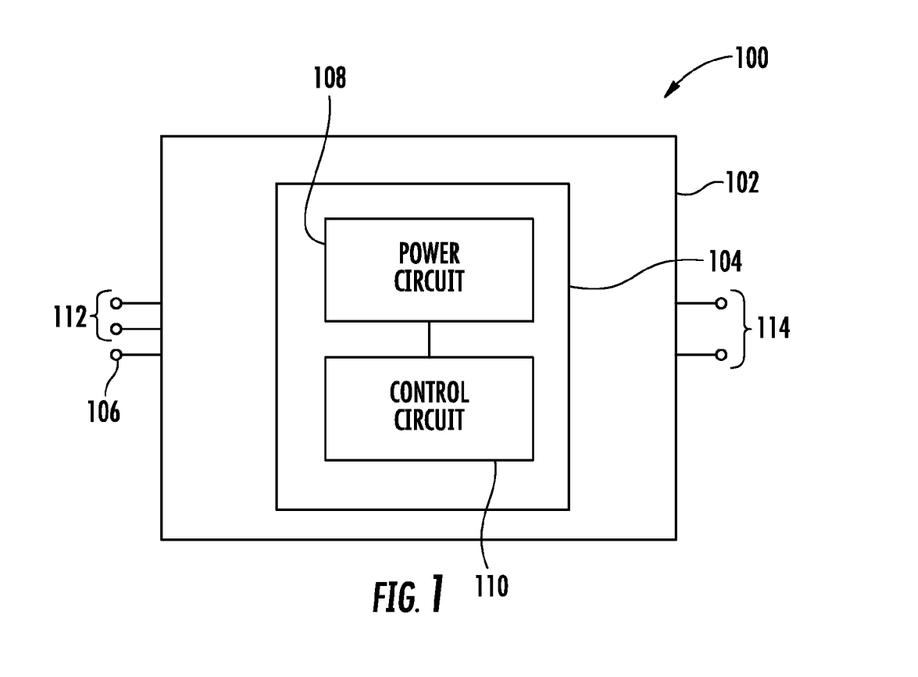
FIG. 1 is a block diagram of a power supply having a single interface port according to one example embodiment of the present disclosure.

A power supply according to one example embodiment of the present disclosure is illustrated in FIG. 1 and indicated generally by reference number 100. As shown in FIG. 1, the power supply 100 includes a case 102 having an interior side and an exterior side, a power supply unit 104 positioned on the interior side of the case 102, and at least one interface port 106 for receiving signals from one or more external devices. The power supply unit 104 includes a power circuit 108 for converting an input voltage or current to an output voltage or current, and a control circuit 110 coupled (e.g., by wires, circuit board leads, etc.) to the interface port 106 and the power circuit 108. The control circuit 110 is adapted to operate the power circuit 108 in response to control signals having a plurality of different control signal formats that are received by the interface port 106.

Some examples of different control signal formats include an analog (AC or DC) voltage within a defined range (e.g., according to IEC60929 Annex E), a two-state logic signal, a pulse width modulated (PWM) signal, a serial communication signal, and a parallel communication signal. The control circuit 110 may be adapted to operate the power circuit 108 in response to any one or more of these (and/or other) control signal formats, as further explained below.

As shown in FIG. 1, the power supply 100 further includes input power terminals 112 for coupling the power supply 100 to an input power source, and output power terminals 114 for coupling the power supply 100 to an electric load. The input power terminals 112 and the output power terminals 114 are both accessible on the exterior side of the case 102.

The interface port 106 may be an electrical terminal such as, for example, an electrical contact, a wire, a lead, a pin, etc. In that event, the interface terminal 106 may be embodied in an electrical connector to facilitate coupling the interface terminal 106 to another device (e.g., using an electrical cable having a mating connector). The input power terminals 112 and/or the output power terminals 114 may also be embodied in the same electrical connector as the interface terminal 106. Alternatively, the interface port may be another suitable type of interface including, for example, a wireless port, an infrared port, etc. As another alternative, one or more of the input power terminals 112 may also serve as the interface port, with programming and/or control signals provided via the input terminal(s) using a suitable power line communication scheme. In that event, the interface port 106 illustrated in FIG. 1 may be omitted.

Preferably, the power supply 100 may be configured for a particular application without requiring opening or removal of the case 102. Further, the power supply unit 104 may be sealed within the case 102 (e.g., to achieve an IP67 rating). In that event, the interface port 106 may be the only way to provide programming and/or control signals to the control circuit 110 within the case 102. Alternatively, the case 102 may be omitted (e.g., the power supply 100 may have an open-frame design).

Figure 2:
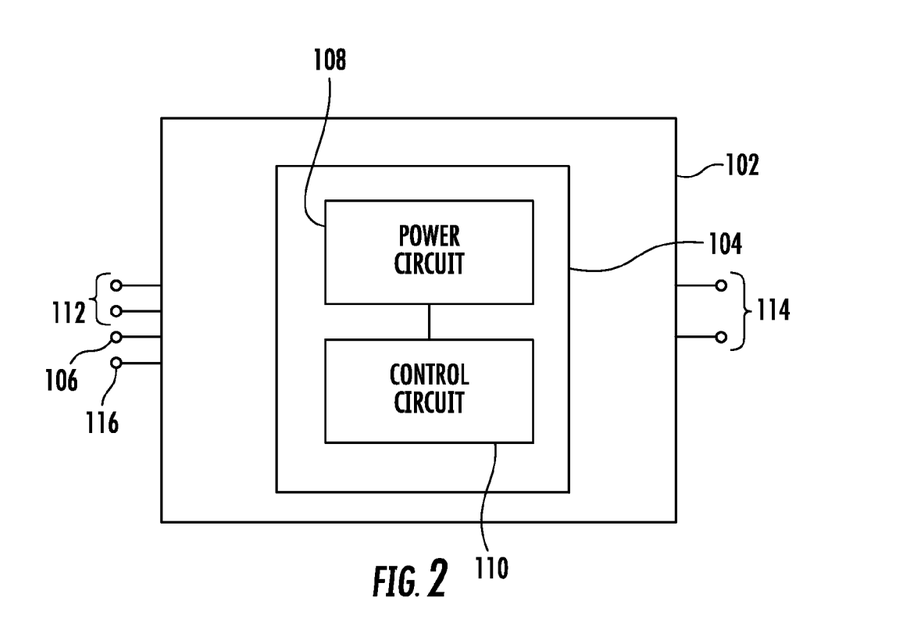
FIG. 2 is a block diagram of another example power supply having two interface ports.

The example power supply 100 shown in FIG. 1 has only one interface port, i.e., the interface terminal 106. Accordingly, communications with external device(s) may be in simplex manner. FIG. 2 illustrates another example embodiment having only two interface ports, i.e., interface terminals 106, 116. Apart from having two interface terminals 106, 116 for communicating with external devices, the power supply of FIG. 2 may be configured in the same manner as the power supply 100 of FIG. 1. In other embodiments, more than two interface ports (i.e., three, four or more interface ports) may be employed without departing from the scope of this disclosure.

With further reference to FIG. 1, the control circuit 110 may be configured to automatically detect the format of control signals received by the interface port 106 and operate the power circuit 108 accordingly. Alternatively, the control circuit may be configured to operate the power circuit in response to control signals having a selected control signal format. For example, suppose the control circuit 110 is adapted for use with three different control signal formats, such as an AC voltage within a defined range, a DC voltage within a defined range, and a PWM signal. At any given time, the control circuit may be configured to respond only to control signals having a selected one of these formats, such as PWM control signals. The control circuit may be so configured via software instructions, via one or more switches, via one or more programming signals received by the interface port 106, or via other suitable means. As a result, the same power supply 100 can be readily configured for use in applications that employ AC voltage control signals, or in applications that employ DC voltage control signals, or in applications that employ PWM control signals.

Additionally, the control circuit may be configured to monitor one or more operating parameters of the power supply 100. Some examples of operating parameters that may be monitored by the control circuit 110 include operating duration, operating temperature, protection history (e.g., history of the operating temperature exceeding a defined limit, etc.), input voltage, input current, output voltage, output current, etc. The control circuit 110 may determine the operating duration of the power supply based on zero crossings of an input AC power source, when applicable. The monitored parameters may be time-stamped and stored in memory. The time stamp may reset (i.e., start at zero) each time the power supply is powered on. In that case, the number of times of the power supply is powered on and off may be determined based on the number and/or position of zero time stamps.

The control circuit 110 may be configured to monitor one or more operating parameters of the power supply in response to one or more programming signals received at the interface terminal 106. Alternatively, the control circuit 110 may be preprogrammed to monitor one or more operating parameters. The control circuit 110 may be configured to transmit data relating to the monitored parameter(s) to an external device, such as device hosting the power supply 100 or a data collection device, via the interface terminal 106. The control circuit 110 may transmit this data periodically, in response to a command signal received by the interface port 106, upon the occurrence of a defined event, etc.

In some embodiments, the control circuit 110 is configured to set (i.e., program or store) one or more operating parameters for the power supply 100 in response to one or more programming signals received by the interface port 106. Thus, the interface port 106 may receive control signals and programming signals. In addition to (or instead of) a control signal format selection, these operating parameters may include one or more of the following: a current threshold for switching between a constant voltage mode and a constant current mode; a current reference for a constant current mode; a voltage reference for a constant voltage mode; a ramp up and/or ramp down profile for an output voltage and/or an output current; a time related sequence; and one or more parameters to be monitored during operation of the power supply 100. Additionally, or alternatively, the control circuit 110 may be configured to set one or more other operating parameters for the power supply 100 in response to programming signals received by the interface port 106.

Figure 3:
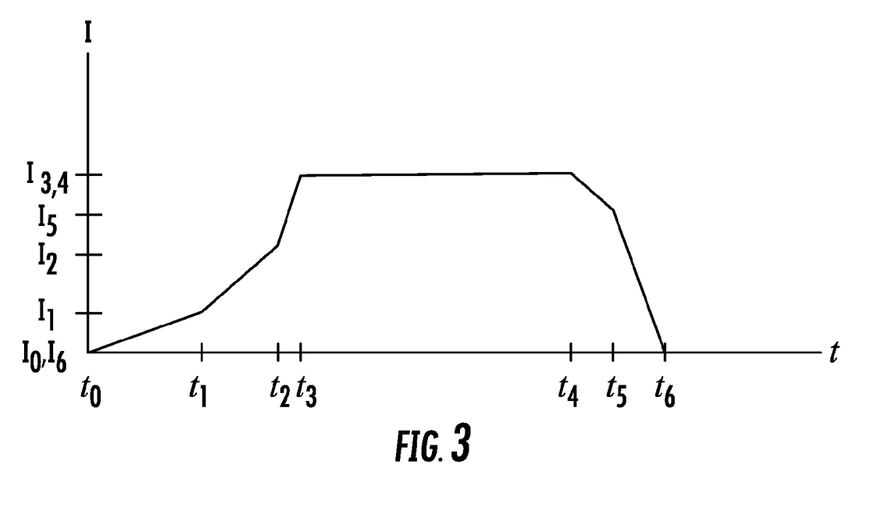
FIG. 3 is a plot an example time related sequence that may be executed by a power supply according to the present disclosure.

FIG. 3 illustrates one example time related sequence. In this particular example, the time related sequence defines the output current level over time for a light emitting diode (LED) street light. As shown in FIG. 3, the output current increases from zero to I1 between the time t0 and t1, increases from I1 to I2 between the time t1 and t2, and increases from I2 to I3 between the time t2 and t3. The output current remains at I3 during the time from t3 to t4, decreases from I3 (also referred to as I4) to I5 between the time t4 and t5, and decreases back to zero between the time t5 and t6. This sequence may be set by programming signals in any suitable manner, including by use of multiple time, current pairs (e.g., level0 at time0, level1 at time1, etc.).

In the particular example shown in FIG. 3, the control circuit is configured to gradually increase (or decrease) the current level between each time/current pair. Alternatively, the control circuit may be configured to increase (or decrease) the current level in other ways between each time/current pair, including step changes, if desired.

The programming signals may be provided to the interface port 106 and the control circuit 110 using any suitable communication protocol, including synchronous and asynchronous protocols. Some examples include UART serial link, non-return zero (NRZ), non-return zero inverted (NRZI), Manchester coding, phase shift keying (PSK), minimum shift keying (MSK), SPI, I2C, PMBus, Modbus, Canbus, etc.

In some embodiments, the control circuit 110 is configured to operate in a configuration mode and a normal mode. During the configuration mode, the control circuit sets one or more operating parameters for the power supply 100, e.g., in response to programming signals received by the interface port 106. During the normal mode, the control circuit 110 operates the power circuit 108 based on the operating parameter setting(s) and, when applicable, one or more control signals received by the interface port 106. As just one example, the control circuit 110 may be configured to operate the power circuit 108 in a constant current mode at a substantially constant output current level that is based on a current reference setting (e.g., set during the configuration mode) and a current control signal received by the interface port 106 (e.g., during the normal mode).

Additionally, the control circuit 110 may be configured to operate in the configuration mode in response to one or more programming signals received by the interface port 106 during startup of the power supply. For example, when the power supply 100 is turned on, the control circuit may check for programming signals at the interface port 106 that indicate a valid host is connected. If such programming signals are present, the control circuit will enter the configuration mode. Otherwise (or subsequently), the control circuit will enter the normal mode and interpret signals received by the interface port 106 as control signals. In this manner, the power supply may be configured (including reconfigured) as desired for a particular application during startup of the power supply, using an external programming device (such as a personal computer, a handheld programming device, a device hosting the power supply, etc.).

Further, the control circuit 110 may include one or more digital processors, such as microprocessors, microcontrollers, digital signal processors (DSPs), etc., that execute software instructions stored in onboard and/or external memory. In that event, the control circuit may be configured to update (i.e., modify or replace) the software instructions for the digital processor(s) in response to one or more programming signals received by the interface port 106. Thus, the same interface port 106 (or multiple interface ports, when applicable) may be used to update software in the power supply 100, to configure the power supply 100 for a particular application, and to control the power supply 100 when the power supply 100 is operating. The interface port(s) may also be used for other purposes.

The control circuit 110 may be divided into a power supply control circuit for controlling the power circuit 108, and an interface circuit operably coupled between the interface port 106 and the power supply control circuit. In that event, the interface circuit may be configured to provide a current reference and/or a voltage reference to the power supply control circuit. Further, the interface circuit may include a pull-up current source and a pull-down current source for supporting various control signal formats, programming communications between an external device and the power supply 100, and/or applications where multiple power supplies 100 are connected in parallel and controlled by a regulated voltage signal (i.e., such that each power supply receives the same control voltage regardless of the number of power supplies connected in parallel). The power supply control circuit and the interface circuit may each include one or more digital processors. In some embodiments, the interface circuit includes only one digital processor, and the power supply control circuit does not include a digital processor, to reduce cost and complexity.

Figure 4:
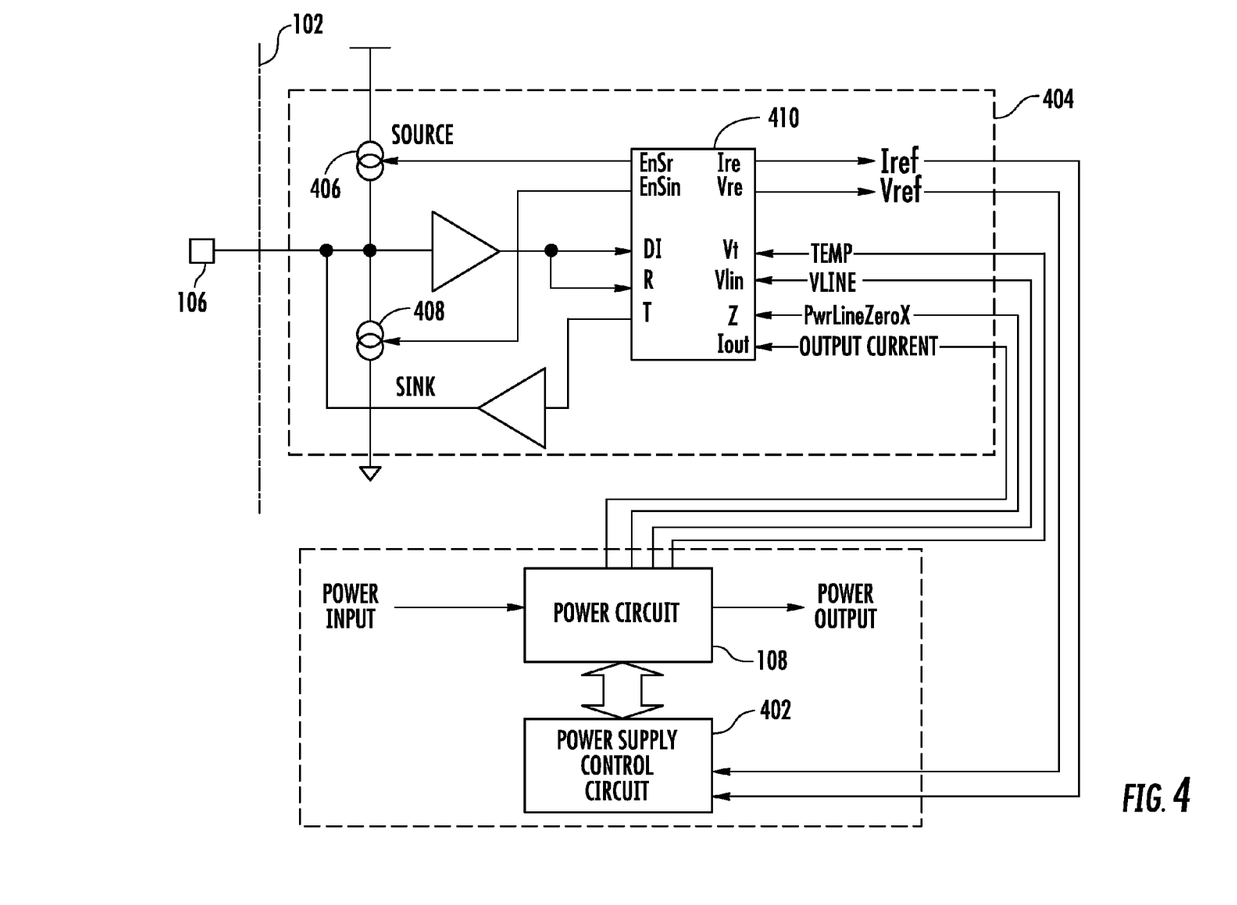
FIG. 4 is an example construction of the power supply of FIG. 1.

FIG. 4 illustrates one example construction of the power supply 100 of FIG. 1. In the example of FIG. 4, the control circuit 110 includes a power supply control circuit 402 for controlling the power circuit 108, and an interface circuit 404 operably coupled between the interface port 106 and the power supply control circuit 402. The power supply control circuit 402 may include one or more digital processors (not shown in FIG. 4). Alternatively, the power supply control circuit 402 may not include a digital processor.

The interface circuit 404 includes a pull-up current source 406 and a pull-down current source 408. Typically, only one current source 406, 408 is used at a given time. The pull-up current source (Source) 406 may be employed for compatibility with, e.g., a 0-10V control signal according to IEC60929 Annex E. The pull-down current source (Sink) 408 may be employed, e.g., in the event multiple power supplies (e.g., of the type shown in FIG. 4) are connected in parallel and driven with a regulated voltage control signal. The pull-down current source 408 may also be used for communications between the interface circuit 404 and an external device. The enable/disable of the pull-up and pull-down current sources 406, 408 facilitates proper matching with analog control signals of various types.

The interface circuit 404 also includes a microcontroller 410 configured to provide a current reference Iref and a voltage reference Vref to the power supply control circuit 402. The current reference Iref and the voltage reference Vref may be analog or digital signals, and may take the form of, e.g., PWM signals. The values of the current reference Iref and the voltage reference Vref may be based on operating parameter settings in the microcontroller 410 (e.g., set by one or more programming signals received by the interface port 106 during the configuration mode) and one or more control signals received by the interface port 106 (e.g., during the normal mode). In this particular example, the voltage reference Vref represents the output voltage setting for the power circuit 108 when the power circuit is operated in a constant voltage mode, and the current reference Iref represents an output current threshold for switching operation of the power circuit 108 between a constant voltage mode and a constant current mode (depending on whether the current threshold is exceeded).

In the example of FIG. 4, the microcontroller 410 includes a dual purpose DI input that allows the input signal to be read as a logic level or a voltage level. The R input is the serial input of UART for decoding serial data receiving by the interface port 106, and the T pin is the transmit pin of UART for sending a serial data stream to the interface port 106. The signals received by the interface port 106 may be conditioned and limited in amplitude so as not to exceed limits of the interface circuit 404, such as limits of the microcontroller 410 and/or other components. The interface circuit 404 may include one or more digital processors in addition to the microcontroller 410. Alternatively, the microcontroller 410 may be the only digital processor in the interface circuit 404. Further, in other embodiments, the interface circuit may be implemented using analog and/or digital circuits, but without a digital processor.

The power supply of FIG. 4 is a driver circuit for one or more light emitting diodes (LEDs), but can also be used for other applications. The power supply of FIG. 4 is configured to operate in a voltage control mode, and output a substantially constant voltage having a voltage level programmed during the configuration mode, until the output current reaches a threshold level also programmed during the configuration mode. Once the output current exceeds the threshold current level setting, the power supply transitions to a current control mode, and outputs a substantially constant current having a current level based on a maximum (and/or minimum) current level programmed during the configuration mode, and a control signal (i.e., a "dimming signal") provided to the interface port 106 during operation of the power supply (i.e., during the normal mode).

Further, the power supply of FIG. 4 may be configured as desired to minimize inrush current to the load. For example, if one or more LEDs are permanently connected to the output, the power supply of FIG. 4 may be configured to ramp up the output voltage (or current) slowly upon startup, to soft start and provide inrush current protection for the LEDs. If the LED(s) may be connected to the output after the power supply is switched on (i.e., hot LED connection), the power supply may be configured with an open circuit voltage level that is substantially equal to the maximum LED voltage for a particular application, or that does not exceed the maximum LED voltage by a large margin. In this manner, the inrush (i.e., surge) current when the LED(s) are connected may be limited. Other techniques may also be employed to limit inrush current by appropriately configuring the power supply.

As shown in FIG. 4, the interface circuit 404 is configured to monitor several parameters of the power circuit 108, including the internal temperature of the power circuit 108, line voltage (e.g., for monitoring power line variations), zero crossings of the input AC voltage (when applicable; for detecting power line frequency and/or measuring the operating duration of the power circuit 108), and output current. As should be apparent, more or less and/or other parameters of the power circuit 108 may be monitored in other embodiments. Further, data relating to the monitored parameters may be stored and/or transmitted by the interface circuit 404 to an external device (e.g., a host device) via the single interface port 106.

Figure 5:
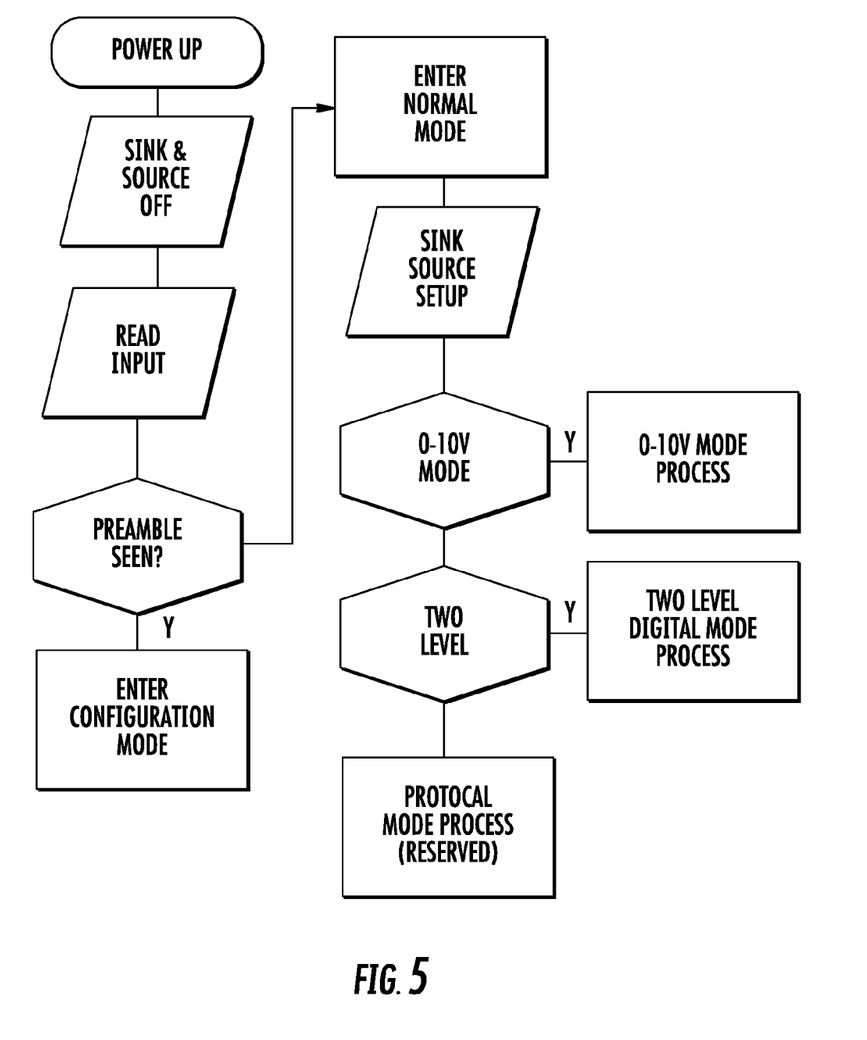
FIG. 5 is a flow diagram of an example process for powering up and operating the interface circuit of FIG. 4.
Figure 6:
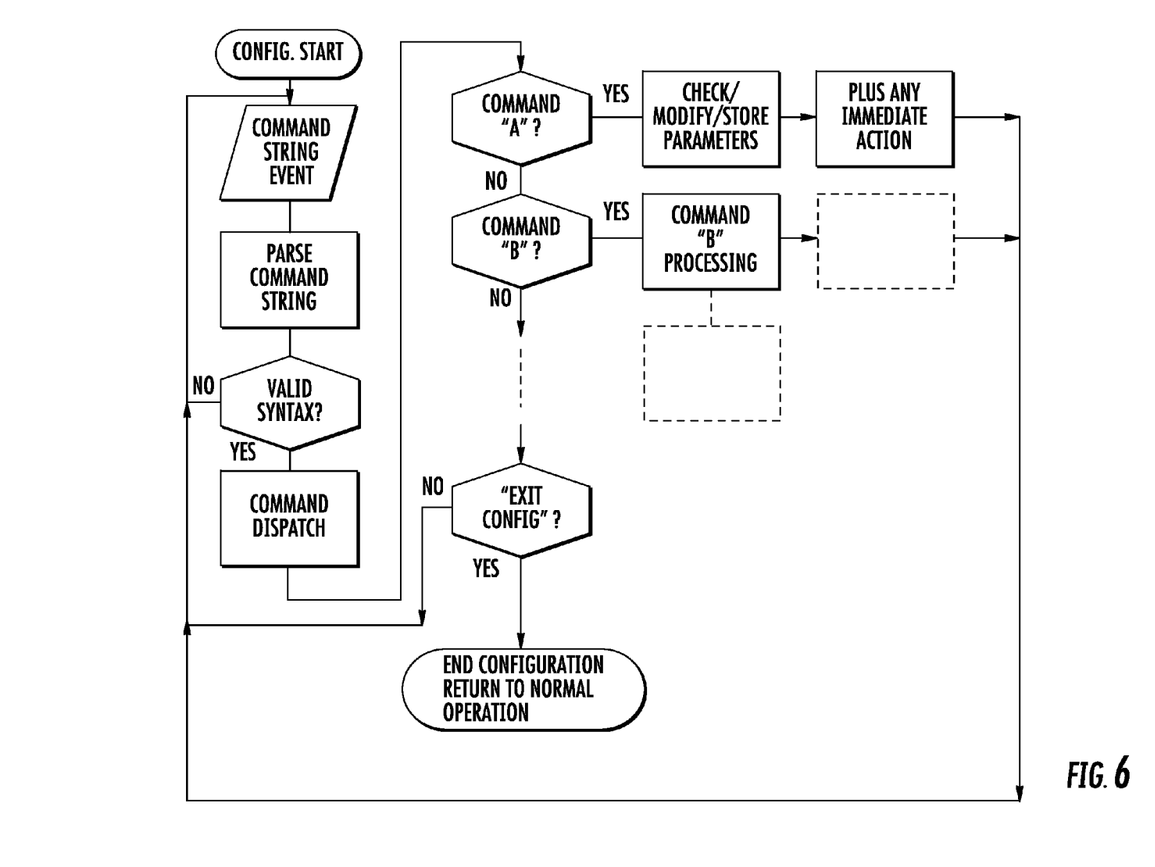
FIG. 6 is a flow diagram of an example configuration mode process for the interface circuit of FIG. 4.

In the example of FIG. 4, the interface port 106 is an electrical terminal. Alternatively, other types of interface ports and/or additional interface ports may be employed, as explained above. FIG. 5 illustrates one example process for powering up and operating the interface circuit 404 in the configuration and normal modes. FIG. 6 illustrates one example configuration mode process.

The various embodiments of the present disclosure may be implemented using any suitable type of power supply including, for example, switched mode power supplies (SMPS).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power supply having a power circuit for converting an input voltage or current to an output voltage or current, an electrical terminal for receiving signals from one or more external devices, and a control circuit coupled to the power circuit and the electrical terminal, the control circuit being configurable while the power supply is operating to operate the power circuit in response to control signals having a selected one of a plurality of different control signal formats that are received by said electrical terminal, and the control circuit being reconfigurable while the power supply is operating to operate the power circuit in response to control signals having another selected one of the plurality of different control signal formats that are received by said electrical terminal.

2. The power supply of claim 1 wherein the plurality of different control signal formats include at least one control signal format selected from the group consisting of an AC voltage within a defined range, a DC voltage within a defined range, a two-state logic signal, a PWM signal, a serial communication signal, and a parallel communication signal.

3. The power supply of claim 1 wherein the control circuit is configured to operate the power circuit according to control signals having the selected control signal format in response to one or more programming signals received by said electrical terminal.

4. The power supply of claim 3 wherein the control circuit is configured to set one or more operating parameters for the power supply in response to one or more programming signals received by said electrical terminal.

5. The power supply of claim 4 wherein the one or more operating parameters are selected from the group consisting of a current threshold for switching between a constant voltage mode and a constant current mode, a current reference for the constant current mode, a voltage reference for the constant voltage mode, a ramp up and/or ramp down profile for an output voltage or an output current, a time related sequence, a control signal format for control signals to be provided to said electrical terminal, and one or more parameters to be monitored during operation of the power supply.

6. The power supply of claim 4 wherein the control circuit is configured to monitor one or more operating parameters of the power supply and transmit data to an external device via said electrical terminal, the data relating to the one or more monitored operating parameters.

7. The power supply of claim 6 wherein the one or more operating parameters to be monitored are selected from the group consisting of operating duration, operating temperature, protection history, input voltage, input current, output voltage, and output current.

8. The power supply of claim 4 wherein the control circuit includes a power supply control circuit for controlling the power circuit and an interface circuit operably coupled between said electrical terminal and the power supply control circuit.

9. The power supply of claim 8 wherein the interface circuit is configured to provide a current reference and/or a voltage reference to the power supply control circuit.

10. The power supply of claim 8 wherein the interface circuit includes a pull-up current source and a pull-down current source.

11. The power supply of claim 8 wherein the interface circuit includes only one digital processor and the power supply control circuit does not include a digital processor.

12. The power supply of claim 8 wherein the control circuit includes one or more digital processors storing software instructions.

13. The power supply of claim 12 wherein the control circuit includes only one digital processor, said only one digital processor configured to control the power circuit in response to said control signals having a plurality of different control signal formats that are received by said electrical terminal.

14. The power supply of claim 12 wherein the control circuit is configured to update the software instructions in the one or more digital processors in response to one or more programming signals received by said electrical terminal.

15. The power supply of claim 4 wherein the control circuit is configured to operate in a configuration mode and a normal mode, wherein the control circuit is configured to set one or more operating parameters for the power supply when the control circuit is operating in the configuration mode, and wherein the control circuit is configured to operate the power circuit based on the one or more operating parameter settings when the control circuit is operating in the normal mode.

16. The power supply of claim 15 wherein the control circuit is configured to operate the power circuit based on the one or more operating parameter settings and one more control signals received by said electrical terminal when the control circuit is operating in the normal mode.

17. The power supply of claim 16 wherein the control circuit is configured to operate the power circuit in a constant current mode at a substantially constant output current level based on a current reference setting and a control signal received by said electrical terminal.

18. The power supply of claim 15 wherein the control circuit is configured to operate in the configuration mode in response to one or more programming signals received by said electrical terminal during startup of the power supply.

19. The power supply of claim 4 further comprising a case having an interior side and an exterior side, the power circuit and the control circuit positioned on the interior side of the case.

20. The power supply of claim 19 wherein the case is a sealed case.

21. The power supply of claim 4 wherein said electrical terminal is a first electrical terminal, the power supply further comprising a second electrical terminal for receiving signals from one or more external devices, the control circuit coupled to the second electrical terminal and adapted to operate the power circuit in response to control signals having a plurality of different control signal formats that are received by said second electrical terminal.

22. The power supply of claim 4 wherein said electrical terminal is the only electrical terminal for receiving signals from the one or more external devices.

23. The power supply of claim 1 wherein said electrical terminal is a first electrical terminal, the power supply further comprising a second electrical terminal for receiving signals from one or more external devices, the control circuit coupled to the second electrical terminal and adapted to operate the power circuit in response to control signals having a plurality of different control signal formats that are received by said second electrical terminal.

24. The power supply of claim 23 wherein the first electrical terminal and the second electrical terminal are the only two electrical terminals for receiving signals from one or more external devices.

* * * * *